A. S. HICKEY.
FISH HOOK.
APPLICATION FILED JULY 11, 1908.
911,040.
Patented Feb. 2, 1909.
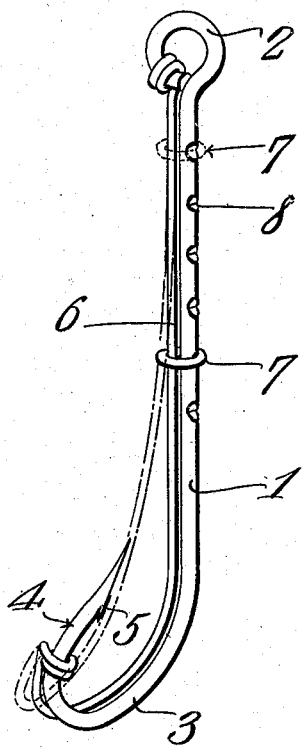
Witnesses
Inventor
Artemas S. Hickey.
By C. A. Snow & Co.
Attorneys

UNITED STATES PATENT OFFICE.

ARTEMAS SHATTUCK HICKEY, OF VENICE, CALIFORNIA.

FISH-HOOK.

No. 911,040.      Specification of Letters Patent.      Patented Feb. 2, 1909.

Application filed July 11, 1908. Serial No. 443,061.

*To all whom it may concern:*

Be it known that I, ARTEMAS SHATTUCK HICKEY, a citizen of the United States, residing at Venice, in the county of Los Angeles and State of California, have invented a new and useful Fish-Hook, of which the following is a specification.

This invention relates to improvements in fish hooks and has for its object to provide a means for securing bait thereto.

It is a well-known fact that anglers experience considerably difficulty in properly securing bait to a hook, and it frequently happens that in order to prevent loss bending the bait upon itself one or more times is often necessary, this is especially true where fresh meat and the like is employed. There are many disadvantages connected with this method chief among which is that a series of openings made in the meat tend to let the blood flow from the latter with the result that after a short time in the water the bait loses its attractive qualities; another disadvantage resides in the fact that unless a considerable quantity of bait is used the shank portion of the hook is exposed.

The present invention aims to remedy these defects by employing a means to securely fasten the bait to the entire shank and bill of the hook in a manner that will effectively hold the same in position under all circumstances, it being necessary to pass the barb through the bait but once and even this is unnecessary in so far as securing the bait is concerned, the advantage gained being merely to hide the bill and barb from view.

With these and other objects in view as will more fully hereinafter appear the present invention consists in certain novel details of construction and arrangement of parts, hereinafter fully described, illustrated in the accompanying drawings, and more particularly pointed out in the appended claims; it being understood that various changes in the form, proportion size and minor details of the device may be made without departing from the spirit, or sacrificing any of the advantages of the invention.

In the accompanying drawing the figure is a perspective view of an ordinary fish hook fitted with my device.

Numerals of reference are employed to designate corresponding parts throughout.

In the construction illustrated a fish hook is shown comprising the usual shank portion 1, terminating at one end in the usual eye 2, by means of which the hook is fastened to a line, the portion extending from the opposite end of the shank 1, curves laterally in the usual way forming the bight 3, which terminates in an inwardly bent bill 4, the end of which is tapered to a sharp point, and formed on the inner face of the bill is a barb 5.

The foregoing is a description of an ordinary fish hook and forms no part of the present invention and it is to be expressly understood that I am not to be limited in applying my invention to this specific form of hook since it will be presently understood how the device can be readily applied to most forms of hooks now in use.

Coming now to the essence of the present invention, attention is directed to the figure of the drawings wherein a wing is shown as being formed of a single piece of spring wire 6 or other suitable resilient material, bent to the configuration of the hook having one terminal suitably secured to the eye 2, and its opposed terminal secured to the bill 4, directly beneath the base of the barb 5, while the device has been illustrated as being secured to the hook by twining the terminals around the eye and bill portions respectively it is to be understood that any other suitable means may be adopted to secure the terminals in position.

It will be observed that adjacent the upper terminal, or that secured to the eye, the wing is sprung laterally in a direction away from the shank, so that the normal position of the member will be that shown by dotted lines. An annular clamping member 7, is formed of metal or other suitable material, the interior diameter of which is sufficient to snugly fit over the wing 6, and shank 1, as shown by dotted lines, so that when moved longitudinally on the shank and in a direction toward the bill 3, the sprung portion of the wing will be drawn to the shank as shown in full lines. It will be further observed that the shank is provided with a plurality of spaced notches 8, of a size sufficient to form seats for the inner face of the member 7, so that when the parts are in position indicated by full lines, the tension of the wing will be sufficient to hold the member 7 to its seat, thereby preventing the latter being forced toward the eye 2, from the foregoing it will be obvious, that when a piece of bait has been inserted between the wing and shank and the member moved sufficiently far in the direction toward the bight, to securely fasten the bait, that danger of the latter becoming disengaged from the parts will be reduced to a minimum.

What is claimed is.

1. A fish hook provided with a lateral wing the terminals of which are secured to the bill and shank of said hook.

2. A fish hook provided with a lateral wing the terminals of which are secured adjacent the opposed ends of said hook, and a means for holding the said wing parallel to the shank and bill of said hook.

3. In combination, a fish hook, the shank of which is provided with a plurality of notches, a wing having its terminals secured adjacent the opposite ends of said hook, a member encircling said wing and shank and adapted to enter the notches of the latter and serving to clamp the parts together.

4. A fish hook provided with a lateral wing the terminals of which are secured to the bill and shank of said hook, and a movable member encircling said wing and shank.

5. The combination of a fish hook, the shank of which is provided with a plurality of notches, a lateral wing secured to said hook, a member encircling said wing and shank adapted to enter the notches of the latter and serving to clamp the parts together.

In testimony that I claim the foregoing as my own, I have hereto affixed my signature in the presence of two witnesses.

ARTEMAS SHATTUCK HICKEY.

Witnesses:
JOSIE I. HICKEY,
PLEZ JAMES.